US006175361B1

(12) United States Patent
Du et al.

(10) Patent No.: US 6,175,361 B1
(45) Date of Patent: Jan. 16, 2001

(54) FREQUENCY GENERATION DURING SWITCH-OVER FOR MULTI-FREQUENCY VIDEO MONITOR

(75) Inventors: Vincent V. Du; Kazuo Kii, both of San Diego, CA (US)

(73) Assignees: Sony Corporation, Tokyo (JP); Sony Electronics, Inc., Park Ridge, NJ (US)

( * ) Notice: Under 35 U.S.C. 154(b), the term of this patent shall be extended for 0 days.

(21) Appl. No.: 08/958,007

(22) Filed: Oct. 27, 1997

(51) Int. Cl.[7] ................................ G09G 5/00; G06K 9/32

(52) U.S. Cl. .......................... 345/213; 345/132; 345/131; 345/127; 382/298; 382/299

(58) Field of Search .................................... 345/131, 132, 345/213, 127; 382/298, 299

(56) References Cited

U.S. PATENT DOCUMENTS 5,270,836 * 12/1993 Kang .................................... 382/298
5,706,035 * 1/1998 Tsunoda ............................... 345/213
5,874,937 * 2/1999 Kesatoshi ............................. 345/132
5,903,253 * 5/1999 Mizutome ............................ 345/132

* cited by examiner

*Primary Examiner*—Richard A. Hjerpe
*Assistant Examiner*—Duc Dinh
(74) *Attorney, Agent, or Firm*—Blakely, Sokoloff, Taylor & Zafman LLP

(57) ABSTRACT

The present invention discloses a method and apparatus for generating a synchronizing signal during a frequency switch-over of an input signal from a first frequency to a second frequency in a video monitor system. The method comprises the steps of: (1) detecting the frequency switch-over; (2) maintaining the synchronizing signal at the first frequency; (3) generating the synchronizing signal at a third frequency; (4) determining if the second frequency is valid; and (5) if the second frequency is valid, generating the synchronizing signal at the second frequency.

20 Claims, 4 Drawing Sheets

FREQUENCY GENERATION DURING SWITCH-OVER FOR MULTI-FREQUENCY VIDEO MONITOR

BACKGROUND OF THE INVENTION

1. Field of the Invention

The present invention relates to frequency generation in video monitor. In particular, the present invention relates to frequency generation during switch-over for multi-frequency video monitor.

2. Description of Related Art

Multi-frequency video monitors operate over a range of frequencies to accommodate various display resolutions. Most personal computer (PC) video controllers can generate different synchronization signals for different display resolutions depending on the user's selection of display mode.

In video processing circuit, the frequency switching is performed by a number of electronic components, one of which is a horizontal output transistor. When a change in horizontal sync signal occurs, the horizontal output transistor has to respond quickly to generate the new horizontal sync signal to drive the horizontal control circuit. However, the frequent transitions from one frequency to another frequency may cause undesirable effects to the switching elements such as the horizontal output transistor in the defelection circuit. In some cases, the device can be damaged.

One simple way to prevent the damage is to slowly change the sync frequency from the old value to the new value so that the horizontal output transistor has sufficient time to respond. However, this method causes noticeable display artifacts and undesirable viewing.

Accordingly, there is a need to provide a method and apparatus for providing frequency generation during switch-over to avoid damage to the switching elements without noticeable display effects.

SUMMARY OF THE INVENTION

The present invention discloses a method and apparatus for generating a synchronizing signal during a frequency switch-over of an input signal from a first frequency to a second frequency in a video monitor system. The method comprises the steps of: (1) detecting the frequency switch-over; (2) maintaining the synchronizing signal at the first frequency; (3) generating the synchronizing signal at a third frequency; (4) determining if the second frequency is valid; and (5) if the second frequency is valid, generating the synchronizing signal at the second frequency.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for providing frequency generation during switch-over of synchronizing signals. Before switching to the new frequency, the previous sync signal is generated, followed by a period of an intermediate free-running frequency.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
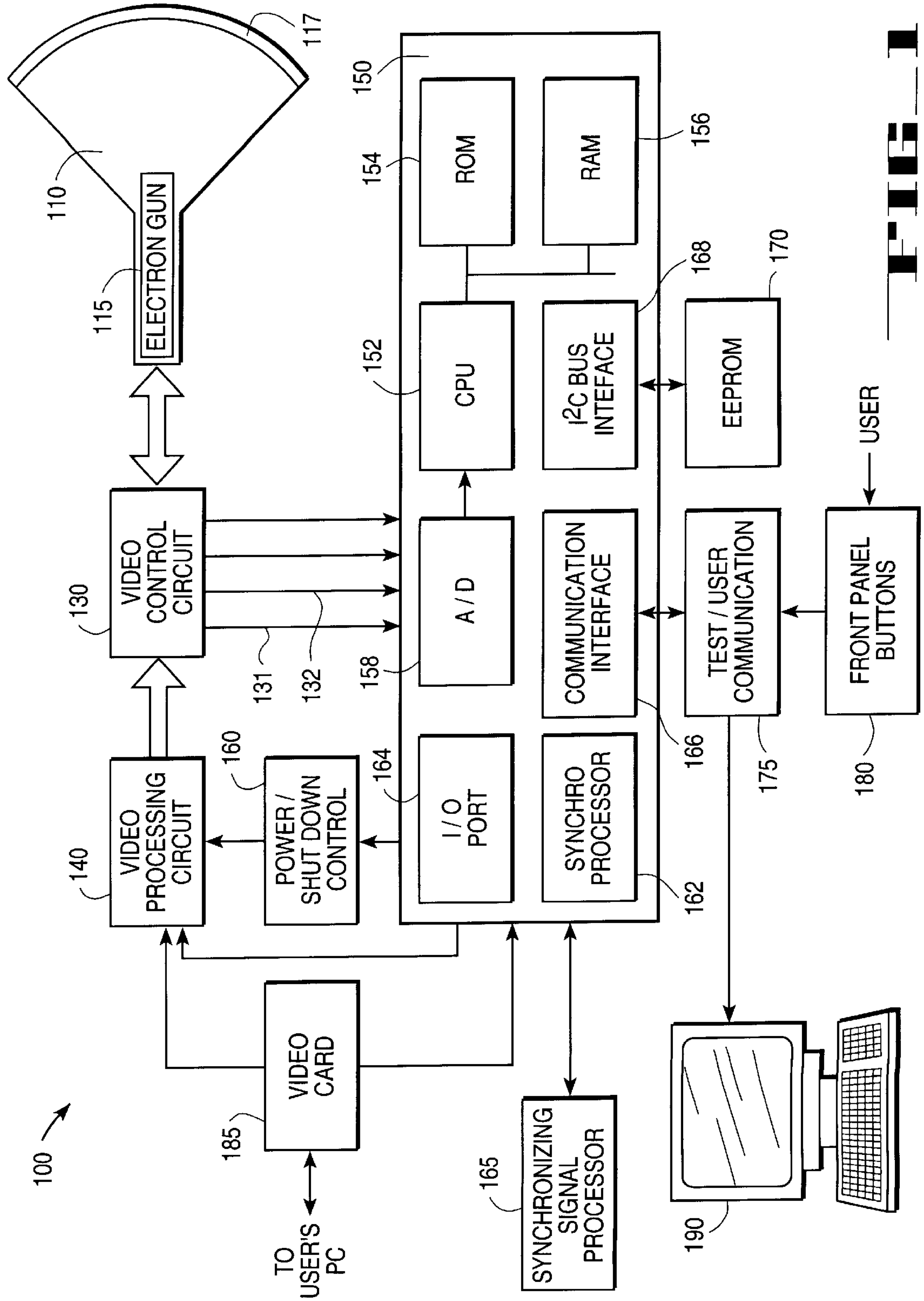
FIG. 1 is a block diagram illustrating one embodiment of a video monitor system that operates in accordance with the teachings of the present invention.

Referring to FIG. 1, a block diagram illustrating one embodiment of a video monitor system 100 that operates in accordance with the teachings of the present invention is shown. The system 100 comprises a picture tube 110, a video control circuit 130, a video processing circuit 140, a processor 150, a power/shutdown control circuit 160, a synchronization signal processor 165, an electrically erasable programmable read only memory (EEPROM) 170, a test/user communication interface circuit 175, a front panel 180, a video card 185, and a test station 190.

Picture tube 110 contains electron gun assembly 115 and phosphor screen 117. Electron gun assembly 115 typically comprises three electron guns corresponding to the red, green, and blue colors. The electron guns emit electron beams that strike the corresponding phosphor to produce picture elements on the screen display.

Video control circuit 130 contains circuitry that control the beam currents and supply voltages to the electron gun assembly 115. The video control circuit 130 also provides feedback information on the operational parameters of the video system. Four important parameters that affect the operation of the video monitor are: the automatic beam current, the high voltage level, the horizonal scan present signal, and the vertical scan present signal. The ABL is expressed as a direct current (DC) voltage which is connected to one analog input channel on the processor 150 via signal line 131. The high voltage level is also a DC voltage connected to one analog input channel on the processor 150 via signal line 132. The horizontal and vertical scan present signals are connected to the input port lines on the processor 150 to the synchro processor 162.

The video processing circuit 140 performs the necessary video control functions. Examples of these control functions include generation of the beam currents, high voltage control, horizontal synchronizing signal, and vertical synchronizing signal. The video processing circuit 140 receives signals from the video card 185, the processor 150, and the power/shutdown control circuit 160.

The processor 150 comprises a central processing unit (CPU) 152, a read only memory (ROM) 154, a random access memory (RAM) 156, and analog-to-digital conver (ADC) 158, a synchro processor 162, an input/output port 164, a communication interface 166, and an $I^2C$ bus interface 168. The processor 150 may be any microprocessor or microcontroller. In one embodiment, processor 150 is a microprocessor having part number ST7275, manufactured by SGS Thomson. The ADC converts an anlog voltage to an 8-bit digital data. An analog multiplexer (not shown) is used to selects an analog input voltage from a number of analog inputs for conversion.

The power/shutdown control circuit 160 receives signal from the processor 150 to generate signal to the video processing circuit 140. When a shutdown condition occurs, the power/shutdown control circuit 160 receives a shutdown command signal from the processor 150. The power/ shutdown control circuit 160 then proceeds to shutdown the video processing circuit 140 and other functional circuitry in the video monitor system 100.

The synchronization signal processor 165 receives synchronizing signals from the processor 150 and provides various synchronization functions such as vertical and horizontal corrections. In one embodiment, the synchronization signal processor 165 is a processor having part number uPC1886CT manufactured by NEC Corporation in Japan.

The EEPROM 170 stores status information, monitor information, initialization information and other operational parameters. The EEPROM 170 is connected to the Inter-Integrated Circuit ($I^2C$) bus interface 166 inside the processor 150. The $I^2C$ bus is a serial bus for communication between the processor 150 and the EEPROM 170.

The test/user communication interface 175 provides input/output communication to the test station 190 and the front panel 180. The test/user communication interface 175 is connected to the communication interface 166 inside the processor 150. The communication may be serial or parallel.

The front panel 180 provides user interface with buttons or switches. The buttons include a MENU button, and other functional buttons to control the operation of the video monitor.

The video card 185 provides video control information and signals to the video processing circuit 140 and the processor 150. The video card 185 is usually a graphics controller card that stores graphic data and generates horizontal and vertical synchronizing signals. The video card 185 is interfaced with the user's computer system.

The test station 190 is a PC with its own monitor and keyboard. The test station communicates with the processor 150 via the test/user communication interface 175. The test station has several modes of operation. During product adjustment, the test station 190 allows test personnel to adjust functional parameters such as the initialization data, and calibration parameters. When the product is returned for repair, the test station 190 can be used to inquire the nature of the failure. The status information stored in the EEPROM 170 can be retrieved and used by the test station 190.

Figure 2:
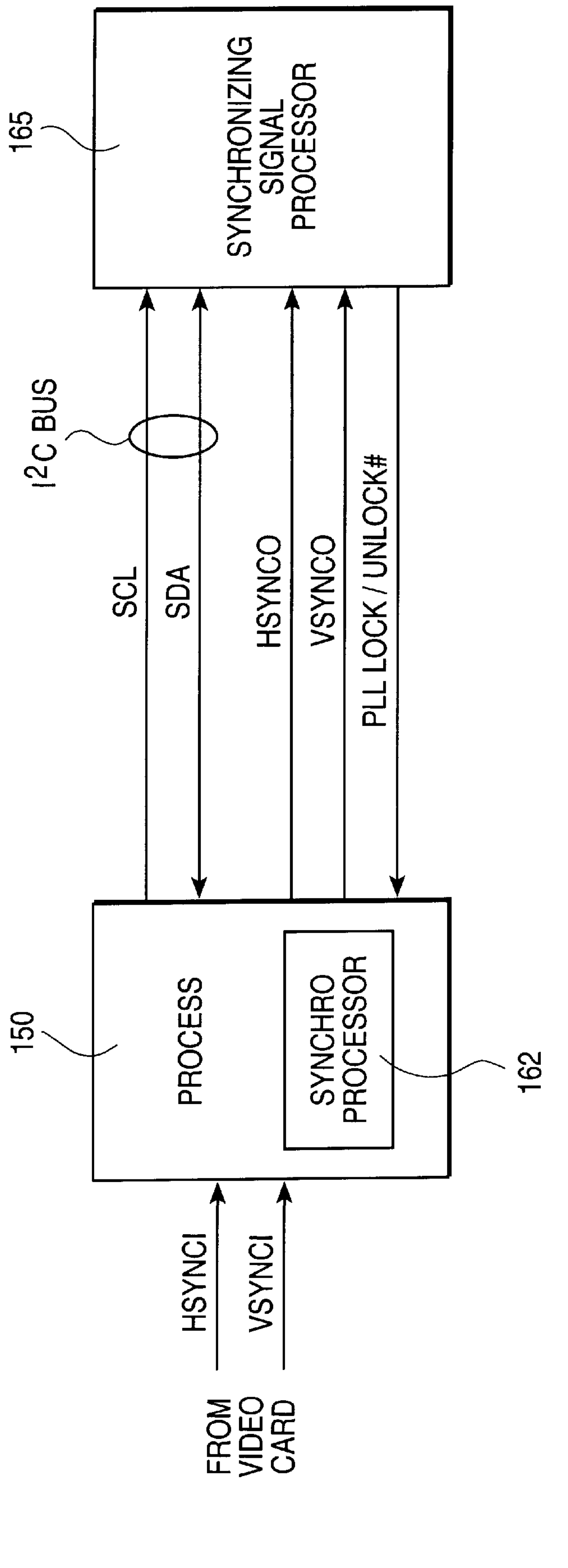
FIG. 2 is a block diagram illustrating one embodiment of the present invention.

Referring to FIG. 2, a block diagram illustrating one embodiment of the present invention is shown.

The processor 150 receives the input horizontal sync (HSYNCI) and vertical sync (VSYNCI) signals. In one embodiment, the HSYNCI and VSYNCI signals come from the video card 185. The processor 150 generates the output horizontal sync (HSYNCO) and vertical sync (VSYNCO) signals. The HSYNCO and VSYNCO become the input signals to the synchronizing signal processor 165. The synchronizing signal processor 165 generates the PLL LOCK/UNLOCK# signal to indicate if the phase-locked loop circuit has locked to the synchronizing signals. A transition from high to low indicates that the phase-locked loop is unlocked. A high level indicates that the phase-locked loop is locked to the synchronizing signals.

The processor 150 receives the PLL LOCK/UNLOCK# signal as an interrupt signal. A high-to-low transition triggers the interrupt and the processor 150 enters an interrupt service routine. The processor exchange data with the synchronizing signal processor via the $I^2C$ bus. The SCL signal is the serial clock and the SDA is the serial data.

Figure 3:
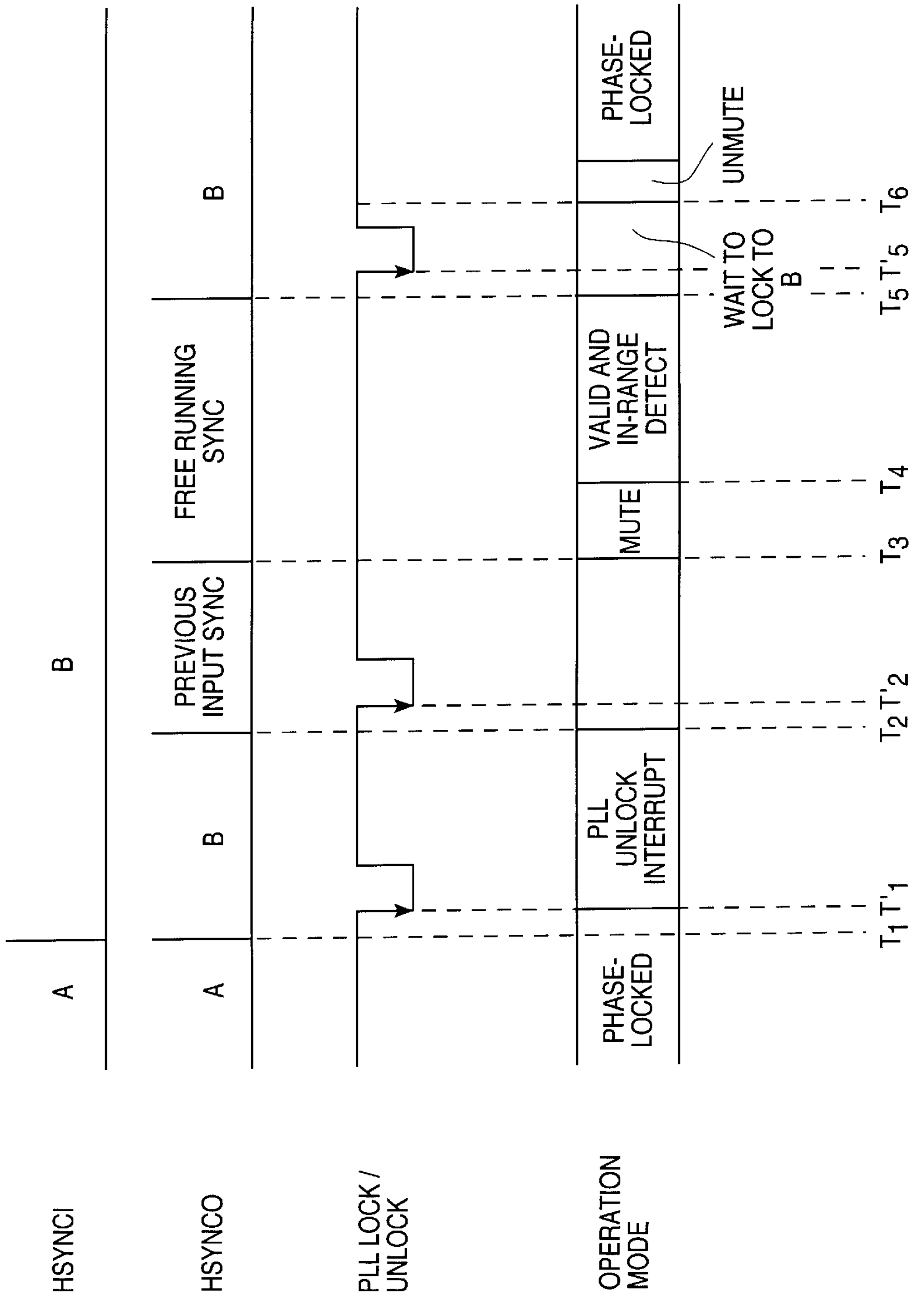
FIG. 3 is a timing diagram illustrating the relationship among the horizontal sync signals and the corresponding operational modes.

Referring to FIG. 3, a timing diagram illustrating the relationship among the horizontal sync signals and the corresponding operational modes is shown.

The HSYNCI is the horizontal sync signal as generated by the video card 185. This horizontal sync signal is processed by the synchro processor 162 inside the processor 150 as shown in FIG. 1. The HSYNCO is the horizontal output signal as generated by the synchro processor 162 to be processed by the video processing circuit 140 as shown in FIG. 1. For illustrative purposes, only the HSYNCI and HSYNCO signals are shown. The PLL LOCK/UNLOCK# signal is the phase-locked loop indicator signal as generated by the synchronizing signal processor 165 to the synchro processor 162. The OPERATION MODE refers to the operating condition of the processor 150 and the synchronizing signal processor 165.

The timing points T1, T1', T2, T2', T3, T4, T5, T5' and T6 are points at which events take place during the frequency switch-over.

As shown in FIG. 3, before T1, the HSYNCI is at frequency A and HSYNCO generates the horizontal and vertical sync signals at frequency A. The horizontal and vertical sync signals are phase-locked as indicated by the logic high level of PLL LOCK/UNLOCK#.

At time T1, the user changes the horizontal sync frequency from frequency A to frequency B. At this time, the synchronizing signal processor 165 detects the frequency change and the phase-locked loop circuitry attempts to lock to the new frequency B.

At time T1', the PLL LOCK/UNLOCK# signal transitions from high to low to generate an interrupt to the processor 150. The operation mode enters the PLL UNLOCK INTERRUPT mode. In this mode, the processor 150 executes the switching capacitor safety, prepares the generation of the previous input sync, invalidates the horizontal sync, and then disables the interrupt. The switching capacitor safety is to ensure that proper capacitors are selected at the proper monitor frequency.

At time T2, the processor 150 generates the previous input sync, i.e., the horizontal sync signal and vertical sync signal at frequency A. At time T2', the PLL LOCK/UNLOCK# signal transitions from high to low to generate an interrupt to the processor 150.

At time T3, the processor 150 generates the free-running sync signals and starts the mute sequence. The free-running sync signals correspond to an intermediate frequency within the range of the operating frequency of the video monitor. In one embodiment, the free running frequency is selectable from a group of the following frequencies: 20 kHz, 24.5 kHz, 29 kHz, 58 kHz, 78 kHz, 97 kHz, 96 kHz, 130 kHz, and 165 kHz. The mute sequence disables the picture tube.

At time T4, the processor 150 waits for the detection of valid and in range horizontal and vertical sync signals.

At time T5, valid and in-range horizontal and vertical sync signals are detected. The processor 150 generates the sync signals at the desired new frequency B.

At time T5', the PLL LOCK/UNLOCK# signal transitions from high to low to generate an interrupt to the processor 150. The processor 150 waits for the phase-locked loop circuit to lock onto the sync signal at frequency B.

At time T6, the sync signals at frequency B are locked. The processor 150 starts the unmute sequence to enable the picture tube and show the display. The operation mode then enters the phase-locked mode with a stable sync signals at the new frequency B.

Figure 4:
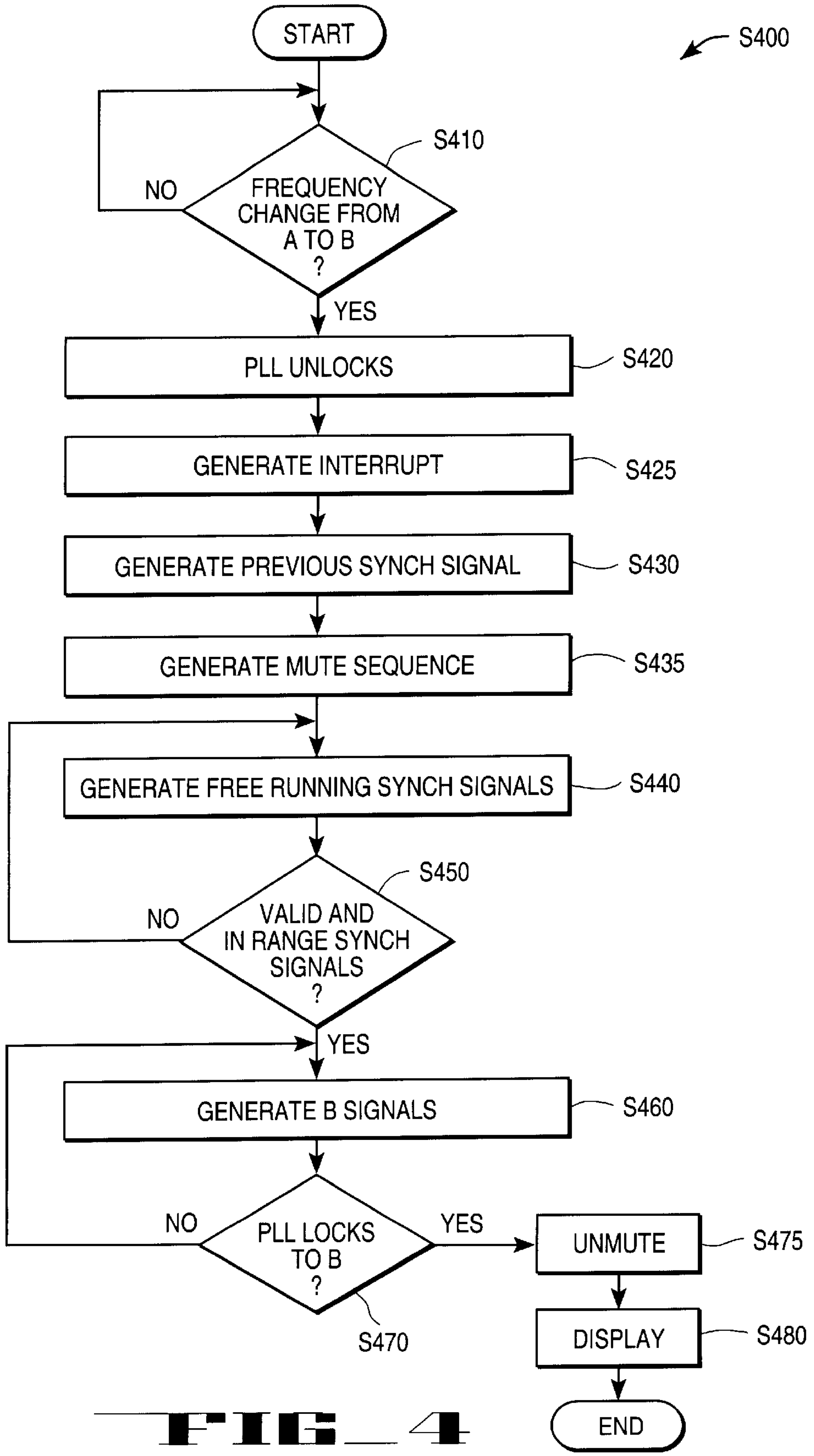
FIG. 4 is a flowchart illustrating one embodiment of a process of generating the sync signals during switch-over.

Referring to FIG. 4, a flowchart illustrating a process S400 to generate the sync signals during the frequency switch-over is shown.

From a START state, the process S400 enters decision step S410 to determine if the frequency is changed from A to B. If NO, the process S400 returns back to step 410. If YES, the phase-locked loop circuit becomes unlock in step S420. The process S400 then enters step 425 to generate an interrupt to the processor. Then the previous sync signals at frequency A are generated in step S430. Then, a mute sequence is started to disable the display in step S435.

The process S400 then enters step S440 to generate free running sync signals. The free running sync signals are at a suitable frequency within the frequency range of the video monitor. Then the process S400 enters decision step S450 to determine if the sync signals are valid and within the appropriate range. If NO, the process S400 returns back to step S440. If YES, the process S400 proceeds to step S460 to generate the sync signals at frequency B.

The process S400 then enters decision step S470 to determine if the phase-locked loop circuit locks to the sync signals at frequency B. If NO, the process S400 returns to step S460. If YES, the process S400 enters step S475 to start the unmute sequence, enabling the display. Then the display is enabled with the sync signals at frequency B. The process S400 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

detecting a frequency switch-over of an input signal from a first frequency to a second frequency in a video monitor system;

maintaining a synchronizing signal at the first frequency;

generating the synchronizing signal at a third frequency;

determining if the second frequency is valid; and if the second frequency is valid generating the synchronizing signal at the second frequency.

2. The method of claim 1 further comprises:

disabling a display on the video monitor system prior to the step of determining if the second frequency is valid; and enabling the display prior to the step of generating the synchronizing signal at the second frequency.

3. The method of claim 1 wherein the third frequency is an intermediate frequency in a frequency range over which the video monitor system operates.

4. The method of claim 1 wherein the input signal is one of a horizontal sync signal and a vertical sync signal.

5. An apparatus comprising:

a first processor to generate a first synchronizing signal responsive to an input signal in a video monitor system; and a second processor coupled to the first processor to generate an indicator signal to the first processor during a frequency switch-over of the input signal from a first frequency to a second frequency, the indicator signal causing the first processor to (1) maintain the first synchronizing signal at the first frequency, (2) generate the first synchronizing signal at a third frequency; (3) determine if the second frequency is valid, and (4) generate the first synchronizing signal at the second frequency if the second frequency is valid.

6. The apparatus of claim 5 further comprises a switching element coupled to the second processor to generate a second synchronizing signal, the second synchronizing signal being synchronized to the first synchronizing signal for driving a video circuit.

7. The apparatus of claim 6 wherein the switching element is a transistor.

8. The apparatus of claim 5 wherein the third frequency is an intermediate frequency in a frequency range over which the video monitor system operates.

9. The apparatus of claim 5 wherein the input signal is one of a horizontal sync signal and a vertical sync signal.

10. The apparatus of claim 5 wherein the indicator signal is an interrupt signal to the first processor.

11. The apparatus of claim 5 wherein the indicator signal indicates if the first synchronizing signal is phase-locked to the second frequency.

12. The apparatus of claim 8 wherein the frequency range is from 20 to 165 kHz.

13. A system comprising:

a video control circuit to control an electron gun assembly in a video system, the video control circuit providing video information;

a video processing circuit coupled to the video control circuit to generate video control signals;

a processor subsystem coupled to the video control and processing circuits, the processor subsystem comprising:

a first processor to generate a first synchronizing signal responsive to an input signal in a video monitor system, and a second processor coupled to the first processor to generate an indicator signal to the first processor during a frequency switch-over of the input signal from a first frequency to a second frequency, the indicator signal causing the first processor to (1) maintain the first synchronizing signal at the first frequency, (2) generate the first synchronizing signal at a third frequency; (3) determine if the second frequency is valid, and (4) generate the first synchronizing signal at the second frequency if the second frequency is valid.

14. The system of claim 13 wherein the processor subsystem further comprises a switching element coupled to the second processor to generate a second synchronizing signal, the second synchronizing signal being synchronized to the first synchronizing signal for driving a video circuit.

15. The system of claim 14 wherein the switching element is a transistor.

16. The system of claim 13 wherein the third frequency is an intermediate frequency in a frequency range over which the video monitor system operates.

17. The system of claim 13 wherein the input signal is one of a horizontal sync signal and a vertical sync signal.

18. The system of claim 13 wherein the indicator signal is an interrupt signal to the first processor.

19. The system of claim 13 wherein the indicator signal indicates if the first synchronizing signal is phase-locked to the second frequency.

20. The system of claim 16 wherein the frequency range is from 20 kHz to 165 kHz.

* * * * *